(12) United States Patent
Yamada

(10) Patent No.: US 8,635,672 B2
(45) Date of Patent: Jan. 21, 2014

(54) THIN CLIENT-SERVER SYSTEM, THIN CLIENT TERMINAL, DATA MANAGEMENT METHOD, AND COMPUTER READABLE RECORDING MEDIUM

(75) Inventor: Wataru Yamada, Tokyo (JP)

(73) Assignee: NEC Corporation, Tokyo (JP)

( * ) Notice: Subject to any disclaimer, the term of this patent is extended or adjusted under 35 U.S.C. 154(b) by 120 days.

(21) Appl. No.: 13/144,487

(22) PCT Filed: Jan. 27, 2010

(86) PCT No.: PCT/JP2010/051455
§ 371 (c)(1),
(2), (4) Date: Jul. 13, 2011

(87) PCT Pub. No.: WO2010/087501
PCT Pub. Date: Aug. 5, 2010

(65) Prior Publication Data
US 2011/0283342 A1    Nov. 17, 2011

(30) Foreign Application Priority Data
Jan. 28, 2009 (JP) ................................. 2009-016476

(51) Int. Cl.
*G06F 7/04* (2006.01)
(52) U.S. Cl.
USPC ............................................................. 726/4
(58) Field of Classification Search
None
See application file for complete search history.

(56) References Cited

U.S. PATENT DOCUMENTS

2007/0077925 A1   4/2007 Hiyama
2008/0147821 A1* 6/2008 Dietrich et al. ............... 709/216

FOREIGN PATENT DOCUMENTS

| CN | 101002179 A | 7/2007 |
| JP | 2004348380 A | 12/2004 |
| JP | 2005228227 A | 8/2005 |
| JP | 2007065835 A | 3/2007 |
| JP | 2007097023 A | 4/2007 |
| JP | 2007156986 A | 6/2007 |
| JP | 2007-172063 A | 7/2007 |
| JP | 2007172063 A | 7/2007 |
| JP | 2008210235 A | 9/2008 |
| JP | 2008-262580 A | 10/2008 |
| WO | 2006018864 A | 2/2006 |

OTHER PUBLICATIONS

International Search Report for PCT/JP2010/051455 mailed Mar. 2, 2010.
Chinese Office Action for CN Application No. 201080005902.4 dated on Aug. 9, 2013 with a Partial English Translation.
Japanese Office Action for JP Application No. 2010-548589 mailed on Nov. 5, 2013 with English Translation.

* cited by examiner

*Primary Examiner* — Brandon Hoffman

(57) ABSTRACT

Provided are a thin client-server system, a thin client terminal, a data management method, and a computer readable recording medium capable of preventing data leakage when the thin client terminal is lost.
A thin client-server system comprising a server provided with a database storing user data, and a thin client terminal acquiring the user data from the server, connected through a network, wherein the thin client terminal is provided with communication processing means to transmit and receive data; storage means to execute a user data acquisition request to the server through the communication processing means, and store the user data acquired from the server in a volatile memory; and control means to judge whether or not a predetermined time has passed after the reference to the user data stored in the volatile memory has been completed, and delete the data stored in the volatile memory when the time has passed.

14 Claims, 6 Drawing Sheets

THIN CLIENT-SERVER SYSTEM, THIN CLIENT TERMINAL, DATA MANAGEMENT METHOD, AND COMPUTER READABLE RECORDING MEDIUM

TECHNICAL FIELD

The present invention relates to a thin client-server system, a thin client terminal, a data management method and a computer readable recording medium.

BACKGROUND ART

The thin client-server system, which uses a low-price and dedicated information processing apparatus having the minimum functions such as displaying on a screen, inputting by use of a key or a mouse, or the like, is well known in these days (refer to patent documents 1 and 2). Hereinafter, the information processing apparatus is called a thin client terminal. According to a thin client-server system described in the patent document 1 or the like, a thin client terminal is connected through a network with a server which unifies management of all resources of an application or the like. According to the thin client-server system, the server holds a program, data, a file of the application or the like, and the application is processed by use of a memory area which is reserved virtually in the server. A process executed by the thin client terminal is limited to a process of inputting and outputting data, and a process of displaying and handling an image on a screen. Consequently, it is possible that the thin client terminal works in an environment of a small memory and a small hard disc, since almost all processes are executed only by use of resource of the server.

As one of solutions for preventing loss and leakage of data due to loss or theft of PC (personal computer), the thin client is widely noticed. Since PC, which is used as the thin client terminal, is not equipped usually with HDD (hard disk drive) or a record drive, PC cannot hold information. Since any information is not leaked even when PC is stolen or lost, the thin client is most suitable for ensuring security. While there are several methods for the thin client system, the following method is effective from a security point of view. According to the method, the server transmits a screen image of application, which is executed by the server, in a pixel unit to the thin client terminal. Then, the thin client terminal receives information in the pixel unit and indicates the information just as it is (refer to patent document 3). Since only the screen image is transmitted, the method is called the screen image transferring method.

Moreover, it is also realizable to use a cellular phone as the thin client terminal. Consequently, it is possible to apply the thin client system to a new use that PCs in an enterprise and in a home are controlled remotely from a destination or the like (refer to patent document 2).

Patent document 1: Japanese Patent Application Laid-Open No. 2007-65835
Patent document 2: Japanese Patent Application Laid-Open No. 2004-348380
Patent document 3: Japanese Patent Application Laid-Open No. 2005-228227
Patent document 4: Japanese Patent Application Laid-Open No. 2007-156986

DISCLOSURE OF THE INVENTION

Technical Problem

The thin client terminal mentioned above processes data through being connected with the server. For example, in the case that a phonebook is referred to, the thin client terminal is connected with the server through the network firstly and downloads phonebook data from the server, and next, stores the downloaded data in a volatile memory of the thin client terminal, and afterward, refers to the phonebook data. According to the characteristics of the volatile memory, the data, which is stored in the volatile memory, is deleted at a time when a power supply is turned off. Accordingly, in the case that the phonebook is referred to again, the thin client terminal downloads the phonebook data afresh from the server.

Since the thin client terminal does not hold data as mentioned above, the thin client-server system is effective for ensuring security. Moreover, since the thin client-server system uses the cheap thin client terminal which does not includes HDD or the like, the thin client-server system can reduce a system cost.

However, in the case that a mobile communication terminal such as a cellular phone is used as the thin client terminal, user often carries the mobile communication terminal whose power supply is turned always on. For this reason, the data is not deleted from the volatile memory since the power supply is not turned off when the mobile communication terminal is lost. Consequently, there is a fear that data leaks out.

An object of the present invention is to solve the problem mentioned above through providing a thin client-server system, a thin client terminal, a data management method, and a computer readable recording medium, which are capable of preventing data leakage when the thin client terminal is lost.

Technical Solution

A thin client-server system according to the present invention, in which a server having a database to store user data, and a thin client terminal acquiring the user data from the server are connected each other through a network, wherein the thin client terminal comprises: communication processing means to transmit and receive data; storage means to issue a user data acquisition request to the server through the communication processing means, and to store user data, which is acquired from the server, in a volatile memory; and control means to judge whether or not a predetermined time has passed since reference to the user data, which is stored in the volatile memory, has been completed, and to delete the data, which is stored in the volatile memory, when the time has passed.

A thin client terminal according to the present invention, which is used in a thin client-server system in which a server having a database to store user data, and the thin client terminal acquiring the user data from the server are connected each other through a network, comprises: communication processing means to transmit and receive data; storage means to issue a user data acquisition request to the server through the communication processing means, and to store the user data, which is acquired from the server, in a volatile memory; and control means to judge whether or not a predetermined time has passed since reference to the user data, which is stored in the volatile memory, has been completed, and to delete the data, which is stored in the volatile memory, when the time has passed.

A data management method according to the present invention, which is used for managing data of a thin client terminal in a thin client-server system in which a server having a database to store user data, and the thin client terminal acquiring the user data from the server are connected each other through a network, includes: issuing a user data acquisition request to the server through a communication processing unit which transmits and receives data; storing the user data, which is sent by the server in response to the request, in a volatile memory; judging whether or not a predetermined time has passed after reference to the user data, which is stored in the volatile memory, has been completed; deleting the data which is stored in the volatile memory when the time has passed.

A computer readable recording medium according to the present invention records a data management program which is used for managing data of a thin client terminal in a thin client-server system in which a server having a database to store user data, and the thin client terminal acquiring the user data from the server are connected each other through a network, and which makes a computer execute: a process for issuing a user data acquisition request to the server through a communication processing unit which transmits and receives data; a process for storing the user data, which is sent by the server in response to the request, in a volatile memory; and a process for judging whether or not a predetermined time has passed after reference to the user data, which is stored in the volatile memory, has been completed, and for deleting the data, which is stored in the volatile memory, when the predetermined time has passed.

Advantageous Effects

The thin client-server system, the thin client terminal, the data management method, and the computer readable recording medium according to the present invention prevent the data leakage at the time when the thin client terminal is lost.

BEST MODE TO CARRY OUT THE INVENTION

An exemplary embodiment of the present invention will be described in detail in the following with reference to a drawing. While there are various preferred limitation, which is imposed on an exemplary embodiment described in the following, from a technical point of view since the exemplary embodiment is a preferred one according to the present invention, the present invention is not limited to these exemplary embodiments as far as the following description does not include an explicit note that the present invention is limited in particular.

A First Exemplary Embodiment (Configuration)

Figure 1:
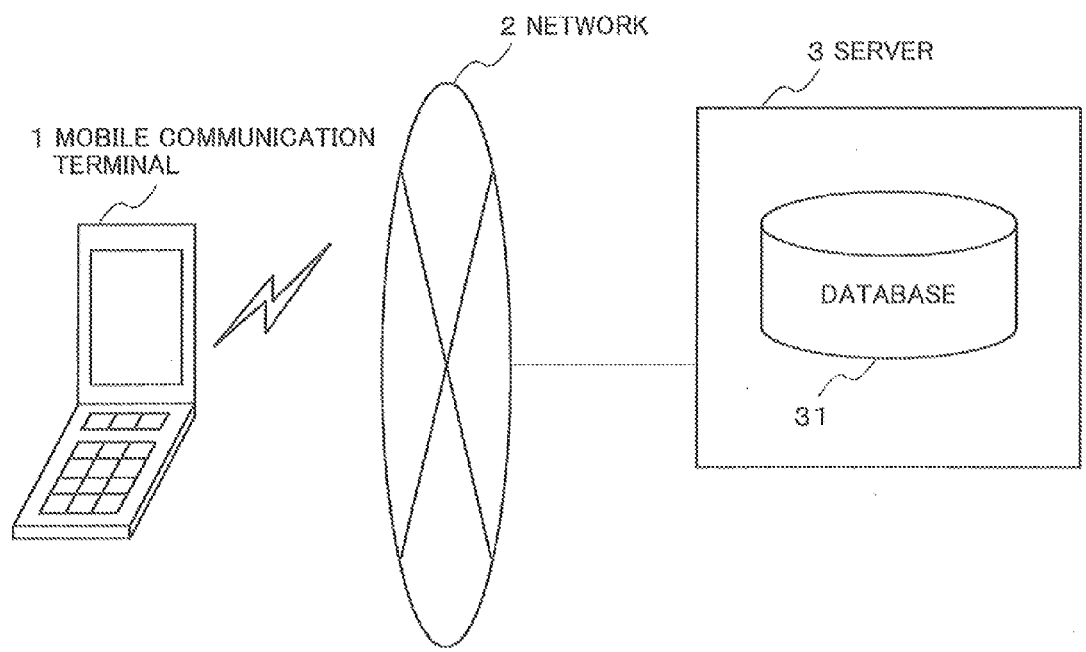
FIG. 1 is a diagram showing a whole configuration of a thin client-server system according to a first exemplary embodiment of the present invention.

FIG. 1 is a diagram showing a whole configuration of a thin client-server system according to a first exemplary embodiment of the present invention. The first exemplary embodiment will be described by use of a mobile communication terminal 1 as an example of a thin client terminal. According to the system of the first exemplary embodiment, the mobile communication terminal 1 and a server 3 are connected each other through a network 2. The mobile communication terminal 1 is connected with the network 2 by use of wireless communication, and specifically, the mobile communication terminal 1 communicates through a base station. Description on the base station is omitted in the specification.

The server 3 includes a database 31 which stores user data, and transmits the user data in response to a request issued by the thin client terminal. A communication processing unit of the server, which transmits and receives data, is omitted in FIG. 1. The user data means phonebook data, schedule data, mail data, music data or the like which can be referred to in the mobile communication terminal 1. It is possible that a plurality of users can share the server 3 through the server 3 having the user data of each user. Moreover, it may be applicable that the server 3 have an authentication function (authentication unit) in order to judge whether an access to the database 31 is permitted or not (whether download from the database is permitted or not) in the case that the server 3 receives a user data acquisition request from the mobile communication terminal 1. The password lock, the IC (Integrated Circuit) card authentication, the face authentication, the fingerprint authentication or the like may be applicable as the authentication method. Meanwhile, it is also possible that the server 3 identifies each user by use of identification information (for example, IP address) which is assigned to each mobile communication terminal. In this case, the server 3 holds authentication data of each user.

The mobile communication terminal 1 does not hold the user data inside (that is, the mobile communication terminal 1 does not have a non-volatile memory). Through the mobile communication terminal 1 issuing a service request (for example, phonebook reference request) to the server 3, the mobile communication terminal 1 downloads data from the server 3 and refers to the downloaded data. In the case that the data is updated, the mobile communication terminal 1 creates the updated information within a volatile memory and transmits the updated information to the server 3. Then, the server holds the updated information.

Figure 2:
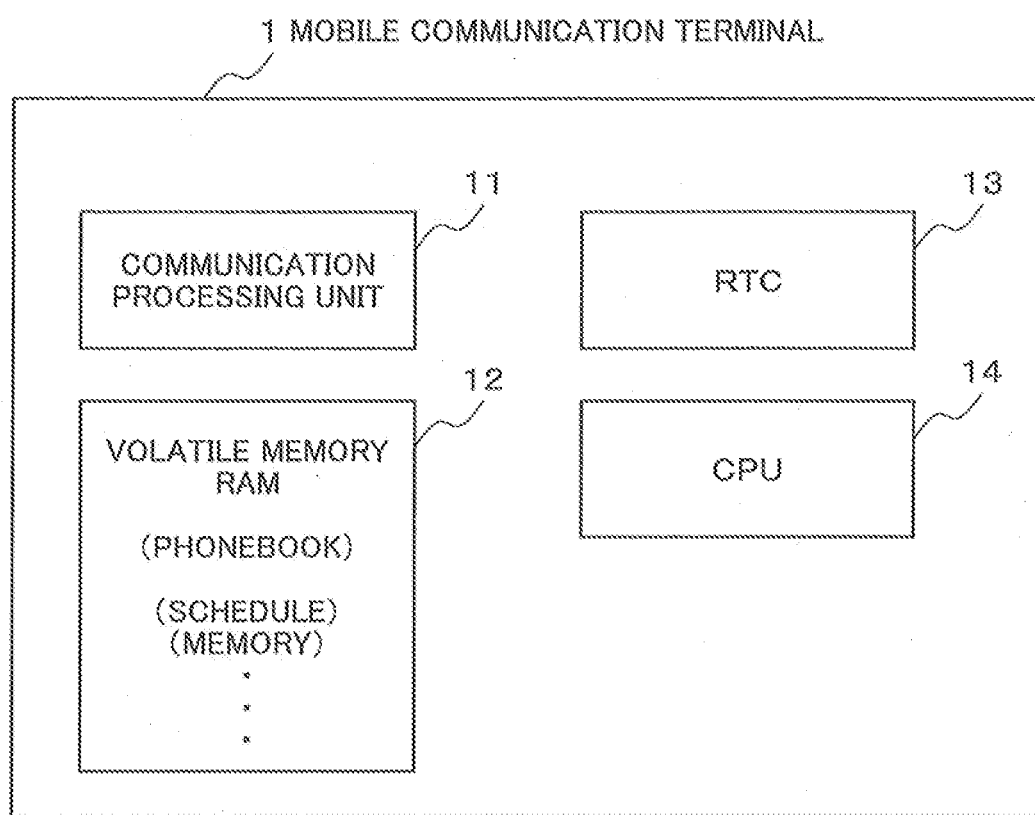
FIG. 2 is a functional block diagram of a mobile communication terminal 1 according to the first exemplary embodiment of the present invention.

FIG. 2 is a functional block diagram of the mobile communication terminal 1 according to the first exemplary embodiment of the present invention. The mobile communication terminal 1 includes a communication processing unit 11, RAM 12 (Random Access Memory) which is the volatile memory, RTC 13 (Real Time Clock) which counts time, and CPU 14 (Central Processing Unit) which is control means to control a whole of the mobile communication terminal 1. The communication processing unit 11 is communication processing means to transmit and receive information through the network 2. The control means controls a whole of or a part of processes of the mobile communication terminal 1. Any substitution of CPU may be used if the substitution can execute a process described hereinafter which CPU 14 executes.

When the mobile communication terminal 1 processes data, it is possible that the mobile communication terminal 1 downloads the user data from the server 3, and stores the downloaded data in RAM 12 of the terminal, and then, refers to the downloaded data and updates the data. It is possible that the mobile communication terminal 1 transmits a file, which is in RAM 12, to the server 3 after updating data, and the server 3 stores the file in the database 31.

(Operational Process)

Figure 3:
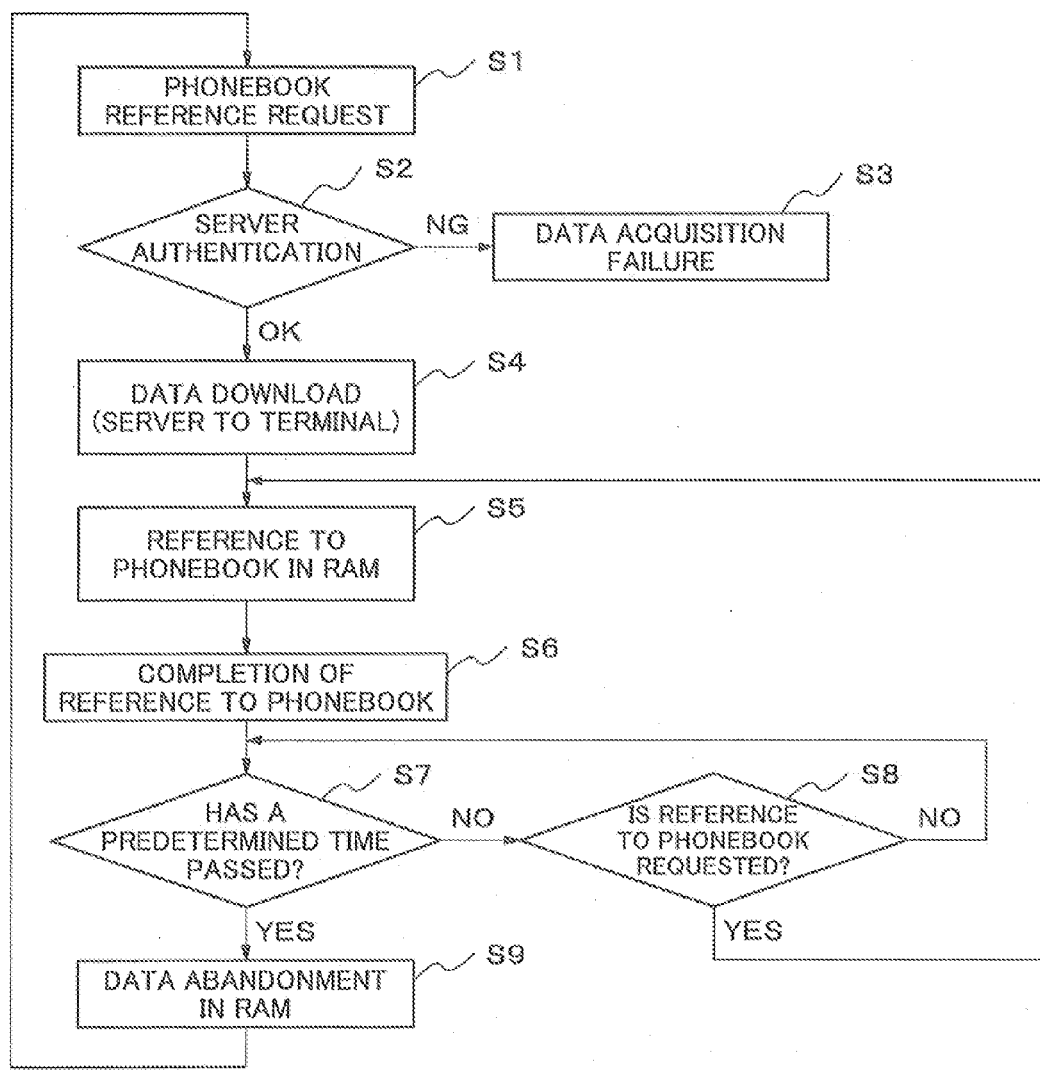
FIG. 3 is a flowchart showing an operational process according to the first exemplary embodiment of the present invention.

An operational process of the thin client system according to the first exemplary embodiment is shown in a flowchart of FIG. 3. According to the first exemplary embodiment, the mobile communication terminal 1, which is connected with the server 3 through the network 2, issues the user data acquisition request to the server 3. Hereinafter, a case of acquiring phonebook data which is an example of the user data, and referencing to the phonebook data (phonebook data reference request) will be described.

The mobile communication terminal 1 issues the phonebook data reference request (Step S1). Then, the server 3 executes authentication (Step S2). The server 3 executes user authentication by use of identification information assigned to the mobile communication terminal 1, a password which user inputs from the mobile communication terminal 1, or the like. The user authentication is executed so as to prevent that a person, who has no right to access to the user data, may acquire information from the server 3. In the case that the authentication result is not good (NG in Step S2), the data acquisition is failed (Step S3).

On the other hand, in the case that the authentication result is OK (OK in Step S2), the mobile communication terminal 1 downloads the desired user data from the server 3. According to the first exemplary embodiment, the mobile communication terminal downloads the phonebook data (Step S4).

The mobile communication terminal 1 stores the downloaded phonebook data in RAM 12. It is possible that the phonebook data is referred to, for example, through a display unit, which is not shown in the figure, displaying the stored phonebook data (Step S5).

In the case that the reference to the phonebook data has been completed (Step S6), it is determined whether or not a predetermined time has passed since a time when the reference to the phonebook data has been completed (Step S7). Time can be counted by RTC13. The completion of the reference to the phonebook data means that a process, in which the display unit displays the phonebook data, is executed. In general, the completion of the reference to the user data means that the mobile communication terminal 1 outputs the user data. For example, in the case that the user data is not the phonebook data but the music data, the completion of the reference to the user data means that a process to play the music data is executed.

It is possible to refer to the phonebook data, which is stored in RAM 12, again (YES in Step S8, and Step S5) until the predetermined time passes (NO in Step S7). In the case that the predetermined time has passed (YES in Step S7), CPU 14 deletes the phonebook data which is stored in RAM 12.

As a result, it is possible to use the data, which is stored in RAM 12, without acquiring the data from the server 3 afresh, since the mobile communication terminal 1 does not delete the phonebook data, which is stored in RAM 12, immediately at the time when the reference to the phonebook data has been completed.

Moreover, in the case that a power supply of the mobile communication terminal 1 is turned off before the predetermined time passes, the data stored in the volatile memory RAM 12 is deleted naturally.

In the case that the phonebook data is referred to after the predetermined time has passed, it is necessary to acquire the data afresh from the server 3 in order to use the data, since the data, which is stored in RAM 12, is deleted. Since the user authentication is necessary as mentioned above in the case of downloading the data from the server 3 (refer to Step S2 in FIG. 3), there is no fear that data leaks out from the mobile communication terminal 1 even if the mobile communication terminal 1 is lost.

As mentioned above, it is possible to refer to the data stored in RAM 12 on the condition that the predetermined time does not pass even if the mobile communication terminal 1 according to the first exemplary embodiment cannot be connected with the server 3 through the network. As a result, it is possible to improve user's convenience. The mobile communication terminal 1 can be used, for example, for playing the music data (example of user data), which is downloaded from the server 3, even if a radio wave does not reach the mobile communication terminal 1 (out of service area). Moreover, the mobile communication terminal 1 can be used for reading the phonebook data when calling by use of a public telephone even if the mobile communication terminal 1 is not available since the mobile communication terminal 1 is out of the service area. In order to realize the above mentioned use, it has been requested that the data can be used even if the mobile communication terminal 1 can not be connected with the server 3 through the network as mentioned above.

Moreover, since a work to connect with the server 3 afresh and to acquire the data is saved, it is also possible to improve a latency time for acquiring the data.

According to the thin client system described above, the mobile communication terminal (thin client terminal) according to the first exemplary embodiment of the present invention can use the data, even if in a state that the mobile communication terminal can not be connected with the server which holds real data. It is because the data, which is received from the server, is cached temporarily within the terminal.

(Measure for Security)

In the case of a client terminal which uses a non-volatile memory, there is a fear that the non-volatile memory is analyzed directly, and consequently, data is stolen even if the data is deleted. On the other hand, since the storage means included in the mobile communication terminal 1 according to the first exemplary embodiment is the volatile memory RAM 12, the data in RAM 12 is deleted when the power supply is turned off. According to the mobile communication terminal 1 of the first exemplary embodiment, there is no fear that the data leaks out from the mobile communication terminal 1, since the data is deleted after the predetermined time has passed even if the power supply is not turned off.

Accordingly, the thin client system according to the first exemplary embodiment of the present invention provides the best measure for security since there is no fear of the information leakage even if the mobile communication terminal 1 is lost or stolen, etc.

A Second Exemplary Embodiment

A thin client system according to a second exemplary embodiment of the present invention will be described in the following. Since the mobile communication terminal (thin client terminal) according to the first exemplary embodiment of the present invention uses the volatile memory RAM 12, the data is deleted by turning the power supply off. Moreover, the mobile communication terminal according to the first exemplary embodiment of the present invention deletes the data after the predetermined time has passed. Meanwhile, the mobile communication terminal may be carried and used in many cases with a power supply thereof being turned on. In the case that the mobile communication terminal is lost with the power supply thereof being turned on, and the predetermined time does not pass, another person can handle the mobile communication terminal before the data is deleted. In this case, there is a fear that the data may be leaked to another person. An object of the second exemplary embodiment is to make security stronger in order to prevent the data leakage.

(Configuration)

Figure 4:
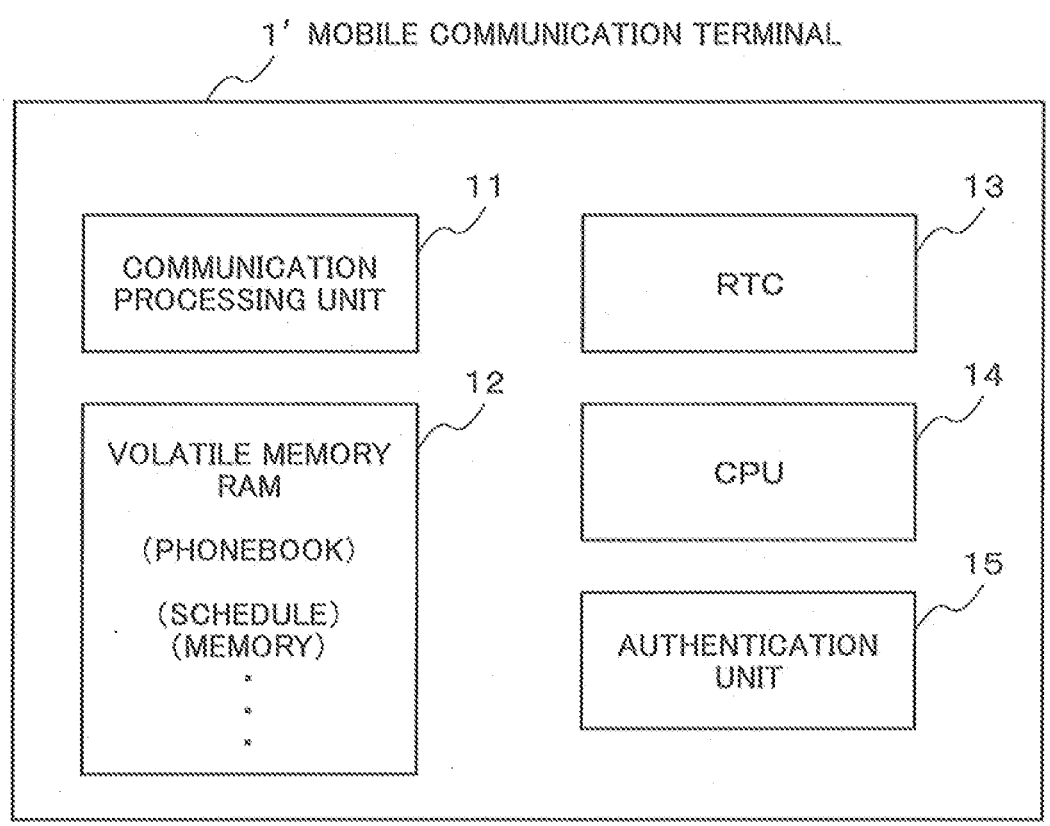
FIG. 4 is a functional block diagram of a mobile communication terminal 1' according to a second exemplary embodiment of the present invention.

A configuration of a mobile communication terminal 1' according to the second exemplary embodiment includes an authentication unit 15 in addition to the communication control unit 11, the volatile memory RAM 12, RTC 13 and CPU 14 which compose the configuration of the mobile communication terminal 1 according to the first exemplary embodiment as described with reference to FIG. 2 (refer to FIG. 4). The authentication unit 15 executes at least one out of a plurality of security functions such as the password lock, the IC (Integrated Circuit) card authentication, the face authentication and the fingerprint authentication.

(Operation)

Figure 5:
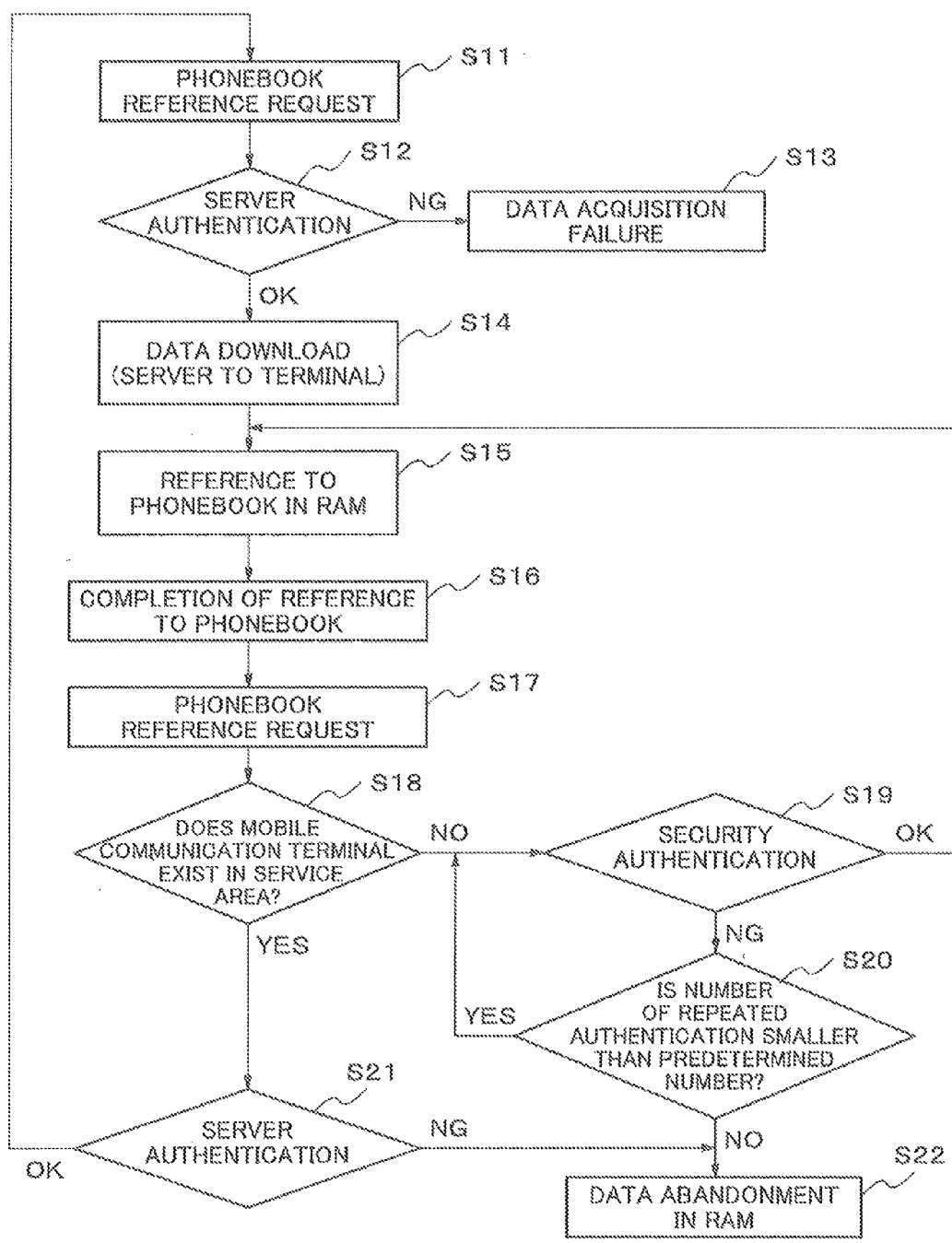
FIG. 5 is a flowchart showing an operational process according to the second exemplary embodiment of the present invention.

An operational process according to the second exemplary embodiment of the present invention is shown in a flowchart of FIG. 5. According to the second exemplary embodiment, a case that user data, which is referred to after the mobile communication terminal 1' is connected with the server 3 through the network 2, is phonebook data will be exemplified in the following.

The mobile communication terminal 1' issues a phonebook data reference request (Step S11). Then, the server 3 executes authentication (Step S12). The server 3 executes user authentication by use of identification information assigned to the mobile communication terminal 1', a password which user inputs from the mobile communication terminal 1', or the like. The user authentication is executed so as to prevent that a person, who has no right to access to the user data, may acquire information from the server 3. In the case that the authentication result is not good (NG in Step S2), the data acquisition is failed (Step S13).

On the other hand, in the case that the authentication result is OK (OK in Step S12), the mobile communication terminal 1' downloads the desired user data from the server 3. According to the second exemplary embodiment, the mobile communication terminal 1' downloads the phonebook data specifically (Step S14).

The mobile communication terminal 1' stores the downloaded phonebook data in RAM 12. It is possible that the phonebook data is referred to, for example, through a display unit, which is not shown in the figure, displaying the stored phonebook data (Step S15).

In the case that the phonebook reference request is issued again (Step S17) after the reference to the phonebook data has been completed (Step S16), the mobile communication terminal 1' judges whether or not the mobile communication terminal 1' exists in a service area (within an area where a radio wave reaches) (Step S18). It may be applicable that the judgment whether or not existing in the service area is executed, for example, by CPU 14 judging whether the communication processing unit 11 can communicate or not.

Meanwhile, the mobile communication terminal 1' does not delete the data, which is stored in the RAM 12, immediately after the reference to the phonebook has been completed, and holds the data continuously in the RAM 12.

In the case that it is judged that the mobile communication terminal 1' exists in the service area in Step S18 (YES in Step S18), the mobile communication terminal 1' executes the authentication again in cooperation with the server 3 (authentication similar to one shown in Step S12). In the case that the authentication results in success, it is possible to refer to the data stored in RAM 12. On the other hand, in the case that all the repeated authentication, whose repetition number is predetermined, results in failure, data acquisition from the server 3 is prohibited for a predetermined time, and the data in RAM 12 is deleted in parallel (Step S22).

In the case that the mobile communication terminal 1' exists outside the service area (NO in Step S18), the mobile communication terminal 1' can not be connected with the server 3 and then, can not execute the authentication. In the case, the authentication unit 15, which is mounted on the mobile communication terminal 1', executes the authentication. The authentication unit 15 realizes a security function such as the password lock, the IC card authentication, the face authentication and the fingerprint authentication. In the case that the authentication executed by the authentication unit 15 results in success, it is possible to refer to the data stored in the RAM 12. On the other hand, in the case that all the repeated authentication, whose repetition number is predetermined, results in failure, (NG (not good) in Step S19 and NO in Step S20), the mobile communication terminal 1' deletes the data which is stored in RAM 12 (Step S22).

Moreover, in the case that a power supply of the mobile communication terminal 1' is turned off, the data, which is stored in the volatile memory RAM 12, is deleted naturally.

According to the second exemplary embodiment, it is necessary to execute server authentication in order to refer to the data which is stored in RAM 12. Moreover, in the case that the authentication, which is executed by server 3, results in failure, the data in RAM 12 of the mobile communication terminal 1' is deleted. Moreover, since the data, which is deleted from RAM 12, still remains in the server 3, the data is not deleted from the system, and furthermore, the data does not leak out from the mobile communication terminal 1'. Moreover, even if user handles the mobile communication terminal 1' wrongly and makes the data deleted from RAM 12, user can download the data from the server 3 through executing the regular procedure.

Moreover, through executing the authentication by use of the authentication unit 15 which is mounted on the mobile communication terminal 1' even if it is impossible to execute the server authentication since the mobile communication terminal 1' exists out of the service area, it is possible to obtain the same effect as one obtained by the server authentication. That is, since it is possible to refer to the data of RAM 12 through executing the authentication even if the mobile communication terminal 1' exists out of the service area, it is possible to respond to user's various needs, and consequently to improve convenience.

According to the thin client system of the second exemplary embodiment of the present invention, it is possible to improve security furthermore and to process the data even in a state that the mobile communication terminal 1' can not be connected with the network.

A Third Exemplary Embodiment

A thin client-server system according to a third exemplary embodiment of the present invention is a combination of one according to the first exemplary embodiment and one according to the second exemplary embodiment. That is, when one out of the following (1) to (3) cases occurs after a mobile communication terminal stores data, which the mobile communication terminal acquires from a server, in a volatile memory and refers to the data, the data stored in the volatile memory is deleted.

(1) a case that a predetermined time has passed (2) a case that a reference request is issued again after reference, and authentication, which the server or the thin client terminal executes, results in being not good (NG)

(3) a case that a power supply is turned off

Consequently, it is possible to prevent leakage of the data due to loss of the mobile communication terminal or the like, even if the mobile communication terminal, whose power supply is turned on continuously, is used as the thin client terminal.

A Fourth Exemplary Embodiment (Configuration)

Figure 6:
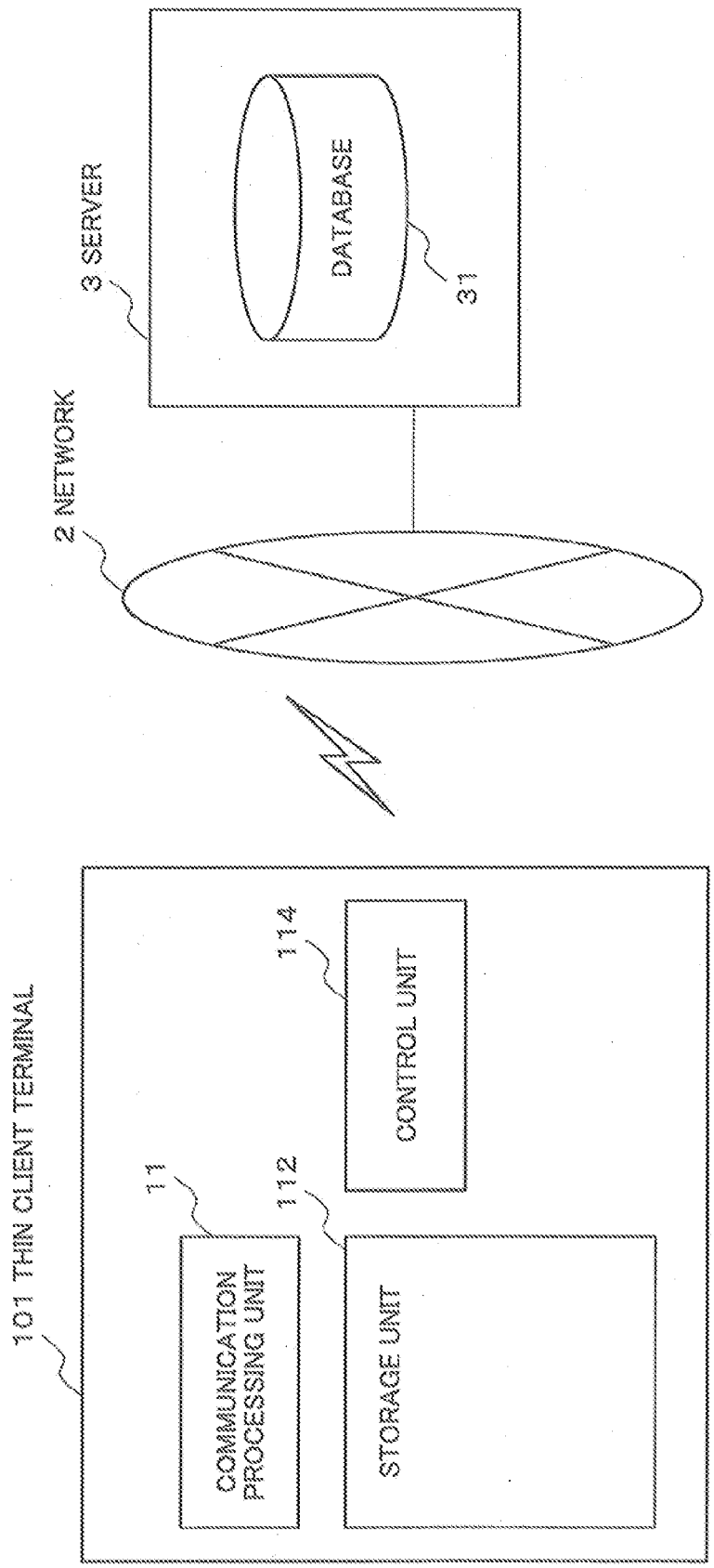
FIG. 6 is a diagram showing a whole configuration of a thin client-server system according to a fourth exemplary embodiment of the present invention.

FIG. 6 is a diagram showing a whole configuration of a thin client-server system according to a fourth exemplary embodiment of the present invention. According to the thin client-server system of the fourth exemplary embodiment, a thin client terminal 101 and the server 3 are connected each other through the network 2. It may be applicable that the thin client terminal 101 is a mobile communication terminal.

The server 3 includes the database 31 which stores user data and transmits the user data in response to a request issued by the thin client terminal 101.

The thin client terminal 101 includes the communication processing unit 11 which is communication processing means to transmit and receive information through the network 2, a memory unit 112 which is storage means, and a control unit 114 which controls a whole of the thin client terminal 101. The memory unit 112 stores data in a volatile memory RAM. It may be applicable that the control unit 114 is CPU.

The thin client terminal 101 does not include a means such as a non-volatile memory to hold the user data inside. Then, the thin client terminal 101 issues a service request to the server 3, and consequently, the thin client terminal 101 downloads the data from the server 3 and refers to the downloaded data. The memory unit 112 stores the downloaded user data in the volatile memory RAM.

The control unit 114 judges whether or not a predetermined time has passed since a time when the reference to the user data has been completed. It is possible to refer to the user data, which is stored in the volatile memory RAM, again until the predetermine time passes. In the case that the predetermined time has passed, the control unit 114 deletes the user data which is stored in the volatile memory RAM.

According to the thin client-server system of the fourth exemplary embodiment of the present invention, there is no fear, as described above, that the data is leaked from the thin client terminal 101 even if the thin client terminal 101 is lost or stolen in a state that a power supply of the thin client terminal 101 is turned on. It is because the control unit 114 deletes the user data after the predetermined time has passed since the time when the reference to the user data has been completed.

A Fifth Exemplary Embodiment

A thin client-server system according to a fifth exemplary embodiment of the present invention, in which a server having a database to store user data, and a thin client terminal acquiring the user data from the server are connected each other through a network, includes: communication processing means to transmit and receive data; storage means to issue a user data acquisition request to the server through the communication processing means, and to store the user data, which is acquired from the server, in a volatile memory; thin client terminal side authentication means to execute authentication for judging whether reference to the user data is permitted or not; and control means to control the thin client terminal side authentication means to execute the authentication in the case that the thin client terminal issues a request for referring to the data, which is stored in a volatile memory, again after completion of the reference to the user data, which is stored in the volatile memory, and to permit the reference to the user data, which is stored in the volatile memory, in the case that the authentication results in success, and to delete the user data, which is stored in the volatile memory, in the case the authentication results in failure.

A Sixth Exemplary Embodiment

A thin client terminal according to a sixth exemplary embodiment of the present invention, which is used in a thin client-server system in which a server having a database to store user data, and the thin client terminal acquiring the user data from the server are connected each other through a network, includes: communication processing means to transmit and receive data; storage means to issue a user data acquisition request to the server through the communication processing means, and to store the user data, which is acquired from the server, in a volatile memory; thin client terminal side authentication means to execute authentication for judging whether reference to the user data is permitted or not; and control means to control the thin client terminal side authentication means to execute the authentication in the case that the thin client terminal issues a request for referring to the data, which is stored in a volatile memory, again after completion of the reference to the user data which is stored in the volatile memory, and to permit the reference to the user data, which is stored in the volatile memory, in the case that the authentication results in success, and to delete the user data, which is stored in the volatile memory, in the case that the authentication results in failure.

A Seventh Exemplary Embodiment

A data management method according to a seventh exemplary embodiment of the present invention, which is used for managing data of a client terminal in a thin client-server system in which a server having a database to store user data, and the thin client terminal acquiring the user data from the server are connected each other through a network, includes: a step to issue a user data acquisition request to the server through a communication processing unit which transmits and receives data; a step to store the user data, which is sent by the server in response to the request, in a volatile memory; and a step to control thin client terminal side authentication means to execute authentication in the case that the thin client terminal issues a request for referring to the data, which is stored in a volatile memory, again after completion of the reference to the user data which is stored in the volatile memory, and to permit the reference to the user data, which is stored in the volatile memory, in the case that the authentication results in success, and to delete the user data, which is stored in the volatile memory, in the case that the authentication results in failure.

An Eighth Exemplary Embodiment

A data management program according to an eighth exemplary embodiment of the present invention, which is used in a thin client terminal of a thin client-server system in which a server having a database to store user data, and the thin client terminal acquiring the user data from the server are connected each other through a network, makes a computer execute: a process for issuing a user data acquisition request to the server through a communication processing unit which transmits and receives data; a process for storing the user data, which is sent by the server in response to the request, in a volatile memory; and a process for controlling thin client terminal side authentication means to execute authentication in the case that the thin client terminal issues a request for referring to the data, which is stored in the volatile memory, again after completion of the reference to the user data which is stored in the volatile memory, and for permitting the reference to the user data, which is stored in the volatile memory, in the case that the authentication results in success, and for deleting the user data, which is stored in the volatile memory, in the case that the authentication results in failure.

A Ninth Exemplary Embodiment

A recording medium according to a ninth exemplary embodiment of the present invention is a computer readable recording medium which records a process of the data management program according to the eighth exemplary embodiment of the present invention.

A program to make CPU execute the process shown in the flowchart of the each figure is included in the program according to the present invention. As the recording medium to record the program, a semiconductor memory unit, an optical and/or magnetic memory unit or the like can be used. Even if the program and the storage medium mentioned above are used in a system or the like whose configuration is different from one described in each exemplary embodiment, it is possible to obtain the substantially same effect as the effect of the present invention by making CPU of the system execute the program.

While the invention has been particularly shown and described with reference to exemplary embodiments thereof, the invention is not limited to these embodiments. It is obvious that various changes in form and details may be made therein without departing from the spirit and scope of the present invention as defined by the claims.

This application is the National Phase of PCT/JP2010/051455, filed Jan. 27, 2010, which is based upon and claims the benefit of priority from Japanese patent application No. 2009-016476, filed on Jan. 28, 2009, the disclosure of which is incorporated herein in its entirety by reference.

EXPLANATION OF REFERENCE 1 and 1' Mobile communication terminal
2 Network
3 Server
11 Communication processing unit
12 Volatile memory RAM
13 RTC
14 CPU
15 Authentication unit
31 Database
101 Thin client terminal
112 Memory unit
114 Control unit

The invention claimed is:

1. A thin client-server system, in which a server having a database to store user data, and a thin client terminal acquiring the user data from the server are connected each other through a network, wherein
the thin client terminal comprises:
a communication processing unit that transmits and receives data;
a storage unit that issues a user data acquisition request to the server through the communication processing unit, the storage unit that stores user data, which is acquired from the server, in a volatile memory;
a thin client terminal side authentication unit that executes authentication to judge whether reference to the user data that is stored in the volatile memory is permitted or not; and
a control unit that controls the thin client terminal side authentication unit to execute the authentication in a case in which the thin client terminal issues a request for referring to the data that is stored in the volatile memory, after completion of the reference to the user data that is stored in the volatile memory, and the control unit permits the reference to the user data that is stored in the volatile memory in a case in which the authentication results in success, and the control unit deletes the user data that is stored in the volatile memory in a case in which the authentication results in failure.

2. The thin client-server system according to claim 1, wherein
the control unit judges whether or not a predetermined time has passed since completion of reference to the user data that is stored in the volatile memory, and the control unit deletes the data that is stored in the volatile memory in a case in which the predetermined time has passed.

3. The thin client-server system according to claim 1, wherein
the user data stored in the database is at least one out of phonebook data, mail data, music data and image data.

4. The thin client-server system according to claim 3, wherein
the server includes a server side authentication unit that checks whether the thin client terminal should be authenticated in the case that the thin client terminal issues the user data acquisition request, and
the server transmits the requested user data to the thin client terminal in the case that the authentication executed by the server side authentication unit results in success.

5. The thin client-server system according to claim 4, wherein
in the case that the communication processing unit can communicate with the server when the request for referring the data stored in the volatile memory is issued again, the control unit controls the communication processing unit to connect with the server, and controls referring to and deleting the data, which is stored in the volatile memory, on the basis of the authentication executed by the server side authentication unit, and in the case that the communication processing unit can not communicate with the server, the control unit controls referring to and deleting the data, which is stored in the volatile memory, on the basis of the authentication executed by the thin client side authentication unit.

6. The thin client-server system according to claim 4, wherein
in the case that the authentication executed by the server side authentication unit or the thin client terminal side authentication unit results in failure, the control unit does not permit the reference to the data which is stored in the volatile memory, and in the case that number of the authentication failures exceeds a predetermined number, the control unit executes control to delete the data which is stored in the volatile memory.

7. A thin client terminal, comprising:
a communication processing unit that transmits and receives data;
a storage unit that issues a user data acquisition request to a server through the communication processing unit, the storage unit that stores user data, which is acquired from the server, in a volatile memory;
a thin client terminal side authentication unit that executes authentication to judge whether the reference to the user data that is stored in the volatile memory is permitted or not; and
a control unit that controls the thin client terminal side authentication unit to execute the authentication in a case in which the thin client terminal issues a request for referring to the data that is stored in the volatile memory, after completion of the reference to the user data that is stored in the volatile memory, and the control unit permits the reference to the user data that is stored in the volatile memory in a case in which the authentication results in success, and the control unit deletes the user data that is stored in the volatile memory in a case in which the authentication results in failure.

8. The thin client terminal according to claim 7, wherein the control unit judges whether or not a predetermined time has passed since completion of reference to the user data, and the control unit deletes the data that is stored in the volatile memory in a case in which the predetermined time has passed.

9. A data management method, which is used for managing data of a thin client terminal in a thin client-server system in which a server having a database to store user data, and the thin client terminal acquiring the user data from the server are connected each other through a network, comprising:
issuing a user data acquisition request to the server through a communication processing unit which transmits and receives data;
storing user data, which the server transmits in response to the request, in a volatile memory;
executing authentication by use of a thin client terminal side authentication unit in a case in which the thin client terminal issues a request for referring to the data that is stored in the volatile memory, after completion of the reference to the user data that is stored in the volatile memory; and
permitting the reference to the user data that is stored in the volatile memory in a case in which the authentication results in success, and deleting the user data that is stored in the volatile memory in a case in which the authentication results in failure.

10. The data management method according to claim 9, further comprising:
judging whether or not a predetermined time has passed since completion of reference to the user data that is stored in the volatile memory, and deleting the data that is stored in the volatile memory in a case in which the predetermined time has passed.

11. A non-transitory computer readable recording medium recording a data management program, which is used for managing data of a thin client terminal in a thin client-server system in which a server having a database to store user data, and the thin client terminal acquiring the user data from the server are connected each other through a network, makes a computer execute:
a process for issuing a user data acquisition request to the server through a communication processing unit which transmits and receives data;
a process for storing user data, which is transmitted by the server in response to the request, in a volatile memory;
a process for executing authentication by use of a thin client terminal side authentication unit in a case in which the thin client terminal issues a request for referring to the data that is stored in the volatile memory, after completion of the reference to the user data that is stored in the volatile memory; and
a process for permitting the reference to the user data that is stored in the volatile memory in a case in which the authentication results in success, and deleting the user data that is stored in the volatile memory in a case in which the authentication results in failure.

12. The non-transitory computer readable recording medium recording the data management program according to claim 11, wherein the data management program makes the computer execute
a processor for judging whether or not a predetermined time has passed since completion of reference to the user data that is stored in the volatile memory, and for deleting the data that is stored in the volatile memory in a case in which the predetermined time has passed.

13. A thin client-server system, in which a server having a database to store user data, and a thin client terminal acquiring the user data from the server are connected each other through a network, wherein
the thin client terminal comprises:
communication processing means for transmitting and receiving data;
storage means for issuing a user data acquisition request to the server through the communication processing means, and for storing user data, which is acquired from the server, in a volatile memory;
thin client terminal side authentication means for executing authentication to judge whether reference to the user data that is stored in the volatile memory is permitted or not; and
control means for controlling the thin client terminal side authentication means to execute the authentication in a case in which the thin client terminal issues a request for referring to the data that is stored in the volatile memory, after completion of the reference to the user data that is stored in the volatile memo and for permitting the reference to the user data that is stored in the volatile memory in a case in which the authentication results in success, and for deleting the user data that is stored in the volatile memory in a case in which the authentication results in failure.

14. A thin client terminal, comprising:
communication processing means for transmitting and receiving data;
storage means for issuing a user data acquisition request to a server through the communication processing means, and for storing user data, which is acquired from the server, in a volatile memory;
thin client terminal side authentication means for executing authentication to judge whether reference to the user data that is stored in the volatile memory is permitted or not; and
control means controlling the thin client terminal side authentication means to execute the authentication in a case in which the thin client terminal issues a request for referring to the data that is stored in the volatile memory, after completion of the reference to the user data that is stored in the volatile memo and for permitting the reference to the user data that is stored in the volatile memory in a case in which the authentication results in success, and for deleting the user data that is stored in the volatile memory in a case in which the authentication results in failure.

* * * * *